United States Patent [19]

Keeler et al.

[11] Patent Number: 5,513,804
[45] Date of Patent: May 7, 1996

[54] METHOD FOR RECYCLING SOLID WASTE USING A DECENTRALIZED RECYCLING SYSTEM

[75] Inventors: Donald E. Keeler, Sussex, N.J.; Gabor Ban, Maybrook; Richard J. Connor, Bloominburg, both of N.Y.; Frederick P. Karsa, Wantage, N.J.; John J. Fasolo, Warwick, N.Y.; Michael Sinocchi, Suffern, N.Y.

[73] Assignee: International Paper Company, Purchase, N.Y.

[21] Appl. No.: 396,844

[22] Filed: Mar. 1, 1995

Related U.S. Application Data

[62] Division of Ser. No. 164,228, Dec. 7, 1993, Pat. No. 5,433,390.

[51] Int. Cl.6 .................................................. B02C 23/24
[52] U.S. Cl. .............................. 241/16; 241/17; 241/23; 241/25
[58] Field of Search ........................ 241/16, 17, 21, 241/23, 25, 27, 38, 41, 60, 65, 99, 101.78, 235, 33, 236, 285.2, 285.3

[56] References Cited

U.S. PATENT DOCUMENTS

| | | | |
|---|---|---|---|
| 2,628,036 | 2/1953 | Hall | 241/47 |
| 2,736,502 | 2/1956 | Toulmin, Jr. | 241/14 |
| 3,589,276 | 6/1971 | Swallert | 100/90 |
| 3,727,850 | 4/1973 | Krigbaum | 241/159 |
| 3,807,296 | 4/1974 | Eck | 100/74 |
| 3,833,178 | 9/1974 | Beck | 241/3 |
| 4,009,838 | 3/1977 | Tashman | 241/99 |
| 4,153,206 | 5/1979 | Haefner et al. | 241/14 |
| 4,379,525 | 4/1983 | Nowicki et al. | 241/20 |
| 4,542,688 | 9/1985 | Bohan | 100/173 |
| 4,809,915 | 3/1989 | Koffsky et al. | 241/36 |
| 4,884,756 | 12/1989 | Pearson | 241/42 |
| 4,889,290 | 12/1989 | Koffsky et al. | 241/36 |
| 4,923,126 | 5/1990 | Lodovico et al. | 241/30 |
| 4,925,117 | 5/1990 | Ramos | 241/236 |
| 4,932,595 | 6/1990 | Cohen et al. | 241/99 |
| 5,035,367 | 7/1991 | Nojima | 241/37.5 |
| 5,048,766 | 9/1991 | Gaylor et al. | 241/65 |
| 5,054,696 | 10/1991 | Mennel et al. | 241/34 |
| 5,135,176 | 8/1992 | Barber | 241/23 |
| 5,174,316 | 12/1992 | Keller et al. | 134/104.3 |
| 5,230,475 | 7/1993 | Gerner | 241/34 |

Primary Examiner—Timothy V. Eley
Attorney, Agent, or Firm—Ostrager, Chong & Flaherty

[57] ABSTRACT

A solid waste recycling system for use in recycling containers containing residual liquids. The recycling system includes a housing having an inlet for receiving the containers. Two pluralities of oppositely rotating rotary knives shred the containers into shreds. A conveyor transports the shreds toward a drying zone. One plurality of spray heads washes the containers with cold or hot water during shredding and another plurality of spray heads washes the shreds with cold or hot water while the shreds are being conveyed toward the drying zone. The hot water and residual liquids are drained off in the drainage zone. The washed shreds are dried in the drying zone. The dried shreds are then stored in the storage receptacle, which is slidably removable from the housing. The rotary knives, drainage zone, dryer and conveyor are all located inside the housing, which is optionally mounted on rollers to provide a portable system.

20 Claims, 11 Drawing Sheets

FIG. 10B

# METHOD FOR RECYCLING SOLID WASTE USING A DECENTRALIZED RECYCLING SYSTEM

This is a divisional of application(s) Ser. No. 08/164,228 filed on Dec. 7, 1993 which is now U.S. Pat. No. 5,433,390.

FIELD OF THE INVENTION

The present invention generally relates to solid waste disposal apparatus for shredding solid waste at remote locations. In particular, the invention relates to an apparatus and a method for disposing of solid waste wherein the shredded waste material is sanitized to reduce bacteria and to control odors during storage.

BACKGROUND OF THE INVENTION

Many systems for disposing of solid waste are known. For example, U.S. Pat. No. 4,009,838 to Tashman teaches a portable solid waste shredder for automatically shredding refuse such as cartons. This shredder is intended for use with a compactor. The apparatus of Tashman includes oppositely rotating pluralities of rotary shredding jaws, accessible through an opening. A chute below the shredding jaws then feeds the shredded material to a conveyor, which carries the shredded waste material to a discharge opening and drains off waste liquids from the shredded waste material.

U.S. Pat. No. 3,807,296 to Eck teaches an apparatus for separating waste materials into decomposable and non-decomposable types, the former being passed through grinding jaws and disposed of through available sewage systems, while the latter is compressed into a compact package. The system of Eck includes a disinfectant dispenser for sanitizing the waste material without drying.

U.S. Pat. No. 4,925,117 to Ramos teaches an apparatus for crushing beverage containers containing liquids. The beverage containers are directed to a pair of synchronized, counter-rotating crushing drums. The liquid formerly held in the container is collected and drained off.

In addition, U.S. Pat. No. 4,809,915 to Koffsky et al. discloses a medical waste disposal apparatus comprising a hopper for receiving waste through a door, a rotary grinder for grinding the waste material and a movable waste receptacle for storing ground material. The grinder assembly is decontaminated by spraying a fine mist of decontaminant from a plurality of spray heads subsequent to operation of the grinder assembly.

U.S. Pat. No. 4,923,126 to Lodovico et al. teaches an apparatus for cutting disposable containers such as plastic bottles or metal cans.

None of the above-described systems are specifically adapted to recycling of milk and juice containers at remote locations. In particular, conventional systems do not address the problems of bacterial growth and odor build-up associated with milk and juice containers stored at remote locations for long periods of time, for example, discarded containers which are picked up weekly or biweekly for disposal at a central location.

SUMMARY OF THE INVENTION

An object of the present invention is to overcome the aforementioned shortcomings of conventional solid waste disposal systems. In particular, it is an object of the present invention to provide a self-contained solid waste recycling system which solves the problems of bacterial growth and odor build-up arising from discarded milk and juice containers which are stored on site at remote locations for long periods of time. It is a further object to reduce the volume of material to be transported to the recycling facility. The equipment is designed to shred, wash, sanitize and dry consumer beverage containers at the location of consumption of the beverages in preparation for shipment to a recycling facility.

A further object of the invention is to provide a system and method for removing residual liquids from discarded plastic and paperboard containers prior to storage of the discarded containers at a remote location and subsequent pickup of the discarded containers for transport to a central recycling center.

Another object of the invention is to provide an economical portable system for recycling liquid containers made of paperboard or plastic material. A related object is to provide a solid waste recycling system which can be readily installed at a remote location, including easy connection to sources of electricity and water.

A further object of the invention is to provide a simple and reliable system for shredding and sanitizing discarded milk and juice containers at remote locations.

The present invention accomplishes the foregoing by providing a solid waste recycling system which shreds discarded paperboard and plastic containers and washes the shreds with cold or hot water (160° F. or more). The hot water and residual liquids from the containers are drained off and then the washed shreds are dried to 10% of moisture control. The dried and sanitized shreds are then stored until pickup for transport to a central recycling center.

In accordance with the solid waste recycling system of the invention, a housing has an inlet for receiving the containers. Two pluralities of oppositely rotating rotary knives shred the containers into shreds. A plurality of spray heads wash the containers with hot water during shredding. The shreds are dropped into a drainage zone. The cold or hot water and residual liquids are drained off in the drainage zone. Conveying means carry the washed shreds from the drainage zone to a drying zone, e.g., a spin drum assembly. The washed shreds are dried in the drying zone. The dried shreds are then dumped into the storage receptacle, which is slidably removable from the housing. The rotary knives, drainage zone, dryer and conveying means are all located inside the housing.

In accordance with a preferred embodiment suitable for use in school cafeterias and fast food restaurants, the housing is mounted on rollers for providing a portable system. In this embodiment, one plurality of spray heads washes the containers with cold or hot water during shredding and another plurality of spray heads washes the shreds with cold or hot water while the shreds are being conveyed toward the drainage zone by conveyor assembly. Further, the conveying means comprises a conveyor belt which elevates the washed shreds from the drainage zone to the drying zone and a spinning drum assembly which spins the shreds until they are dry and drops the dried shreds into the storage receptacle.

The present invention further encompasses a method for recycling, at a remote location, containers made of plastic or paperboard and containing residual liquids. The method comprises the following steps: depositing the containers through an inlet in a housing; shredding the containers inside the housing; conveying the shreds toward a drainage zone; washing the shreds with cold or hot water; draining off the cold or hot water and the residual liquids in the drainage zone; conveying the washed shreds from the drainage zone to a drying zone; drying the washed shreds before storage in the storage receptacle; dropping the dried shreds into the storage receptacle; and storing the dried shreds in the storage receptacle.

DETAILED DESCRIPTION OF THE PREFERRED EMBODIMENTS

Figure 1:
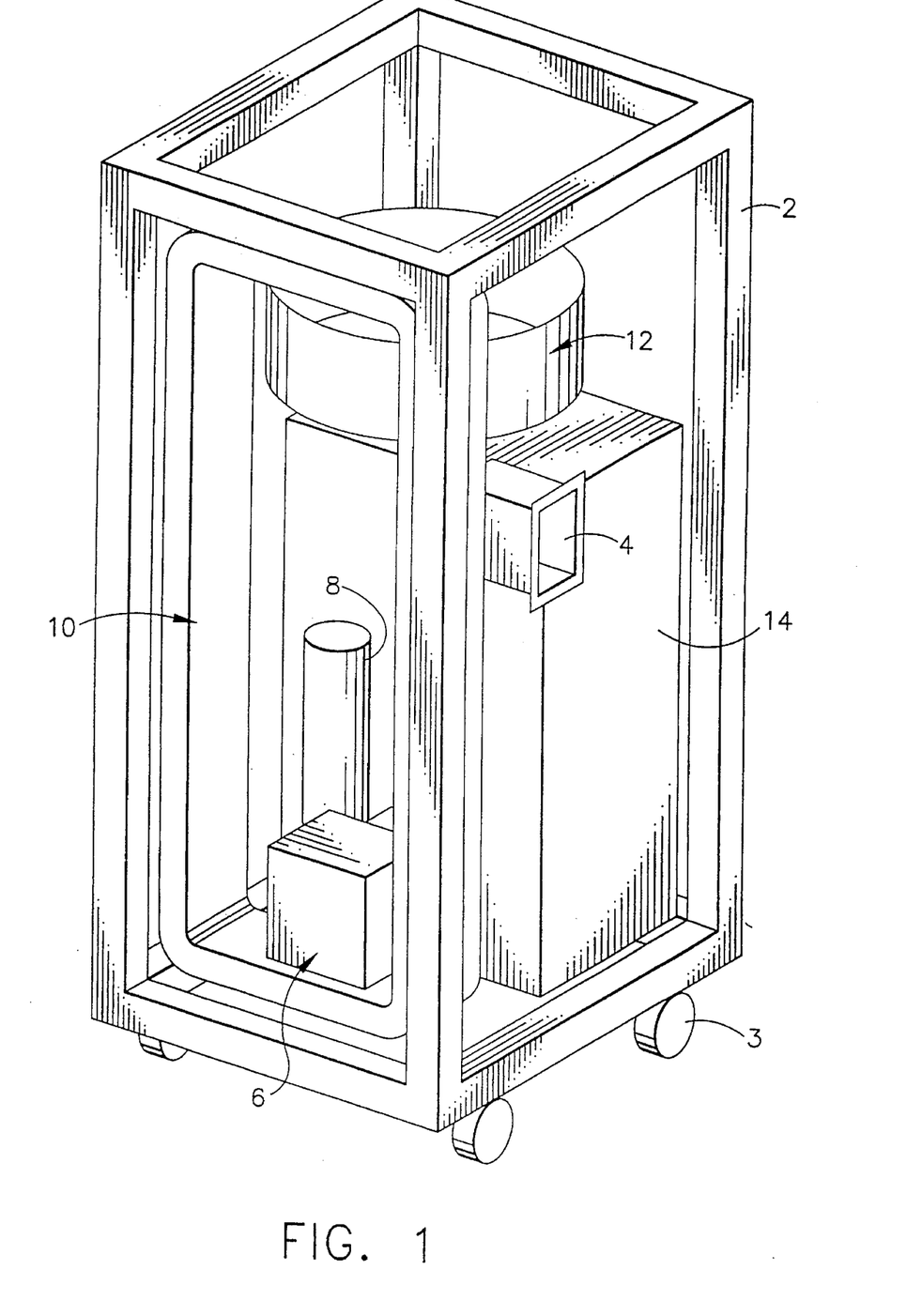
FIG. 1 is a concept drawing showing a perspective view of the portable solid waste recycling system in accordance with a preferred embodiment of the invention.

FIG. 1 shows the recycling system in accordance with the preferred embodiment of the invention. The components of the recycling system are housed in a frame 2 about the size of a commercial bottle or can recycling machine. Frame 2 is mounted on a plurality of rollers 3, which facilitate transport of the portable recycling system. The major functional components of the system are a carton loading chamber 4, a shredder box assembly 6, a motor 8, a conveyor assembly 10, a spin drum assembly 12 and a removable storage bin 14.

Figure 2A:
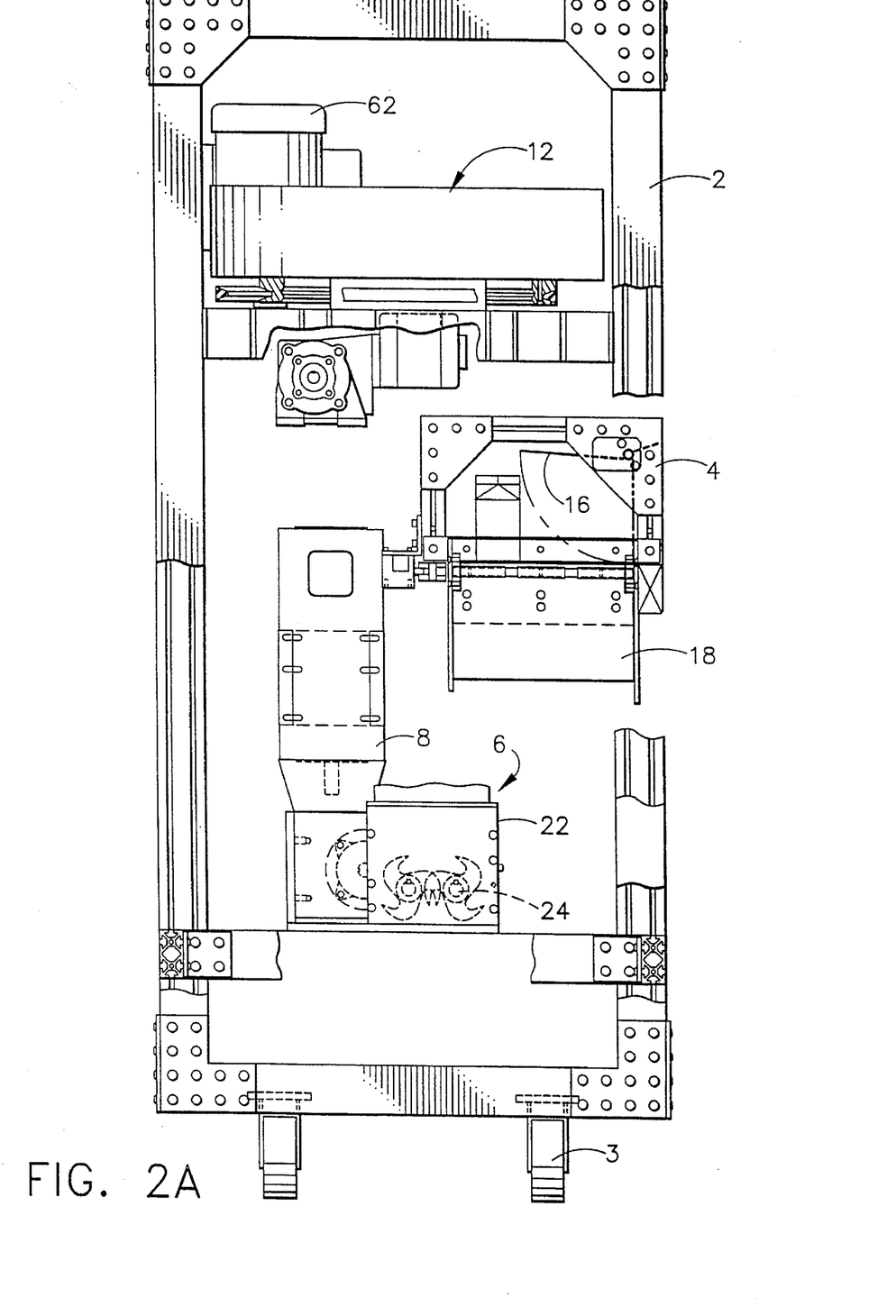
FIGS. 2A and 2B are partially cutaway end and front views respectively of the portable solid waste recycling system in accordance with the preferred embodiment depicted in FIG. 1.
Figure 2B:
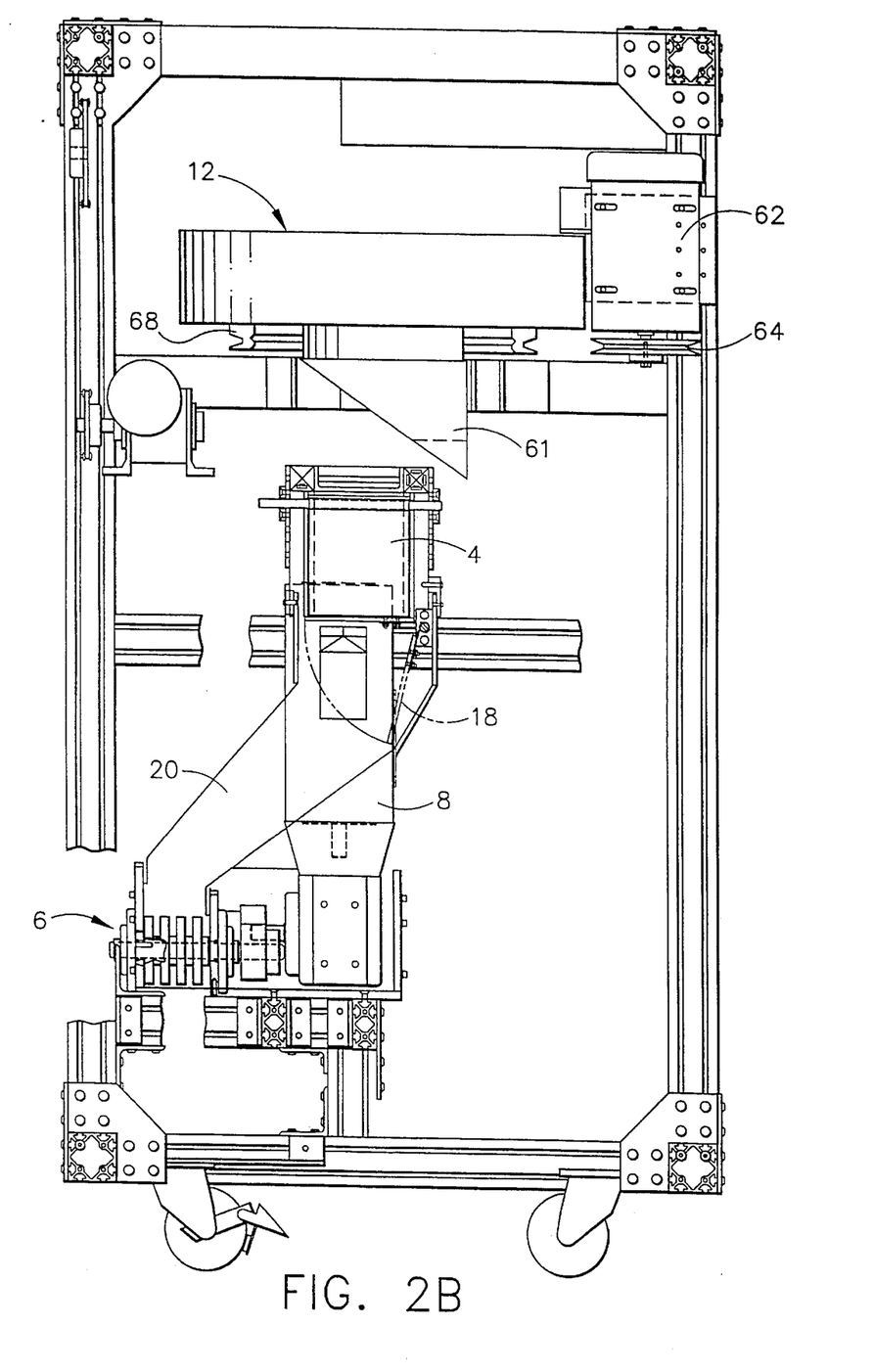

Referring to FIGS. 2A and 2B, the carton loading chamber 4 is constructed as a closed chamber preventing access to the interior mechanisms of the equipment while cartons are being loaded. A hinged front loading door 16 (FIG. 2A) is opened to insert a carton to be shredded and then is locked in a closed position while the carton is being transported out of the loading chamber via an electrically actuated trapdoor mechanism 18. The trap-door 18 opens after the loading door 16 has been opened and then closed and drops the cartons into the transport chute 20 (FIG. 2B) from the loading chamber 4. The transport chute 20 guides the cartons into the shredding box assembly 6 located below the loading chamber 4. The shredding box assembly 6 consists of a closed, water-tight chamber 22 (FIG. 2A) containing a rotary shredder 24. The shredding knives of rotary shredder 24 are driven to rotate by a motor 8.

Figure 5:
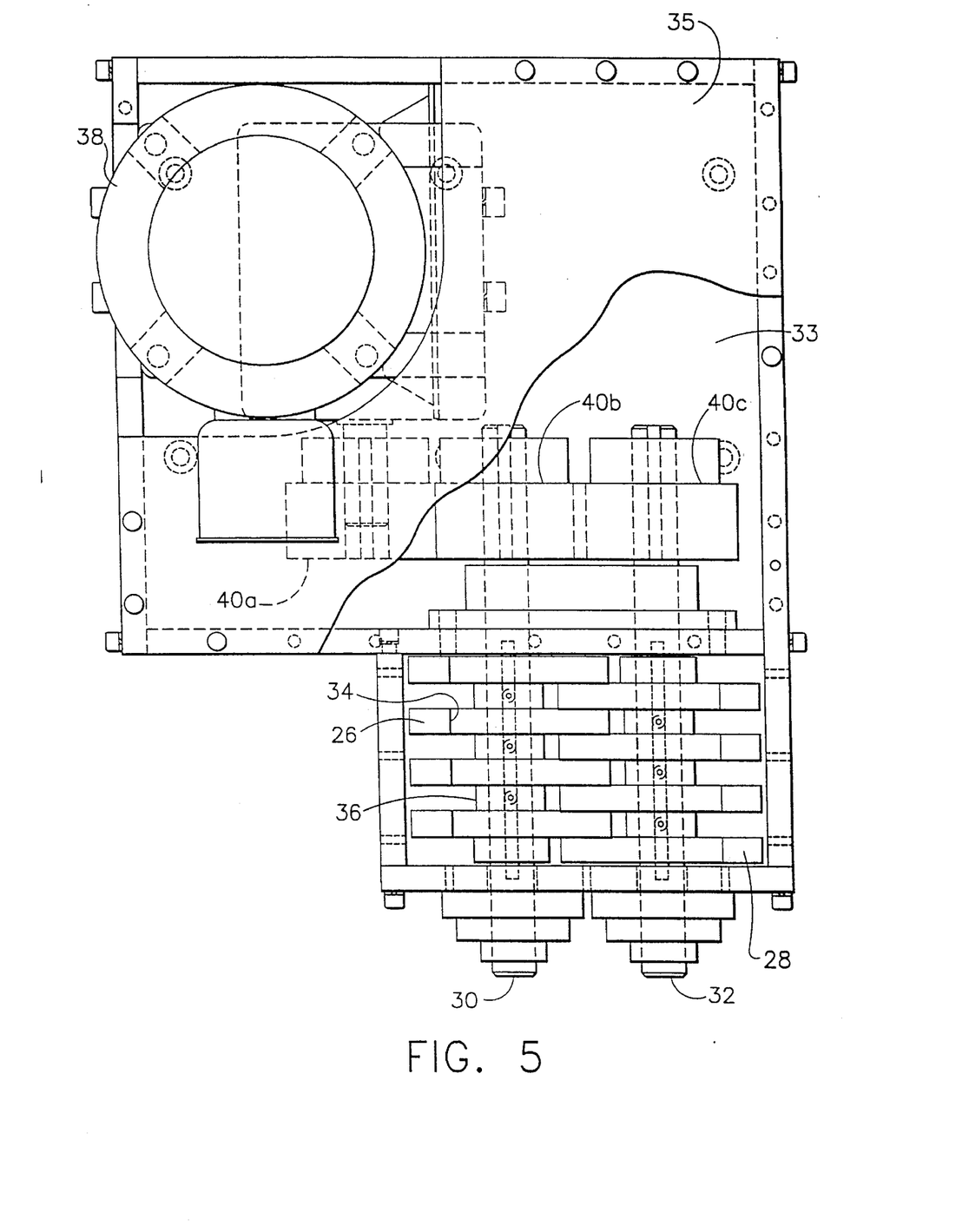
FIG. 5 is a schematic showing a partially cut away top view of the shredding box assembly in accordance with the preferred embodiment of the invention.
Figure 6:
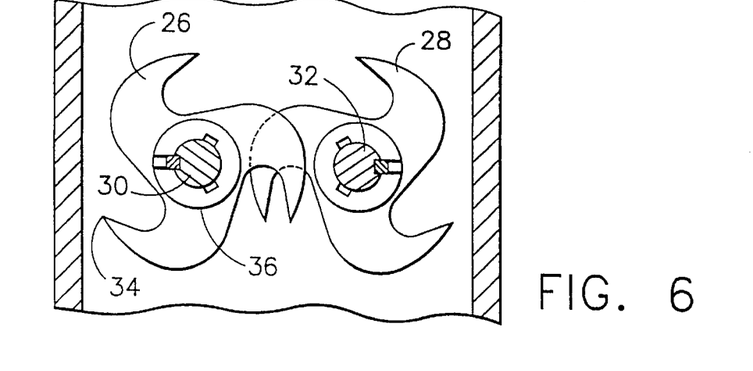
FIG. 6 is a schematic showing the structure of the rotary knives contained in the shredder box assembly depicted in FIG. 5.

Referring to FIGS. 5 and 6, shredding occurs when a carton is passed through two sets of interleaved shredding knives 26, 28 mounted on contra-rotating parallel shafts 30, 32, contained in shredder box assembly 6. The shredder box assembly consists of a shredder box base 33 and a spacer 35 as the top of the shredder box. Each shredding knife 26, 28 incorporates three arcuate teeth 34 along their circumference, designed to penetrate the carton sides and pull the carton through the knives. The knives are some fraction of an inch thick and are spaced apart on their respective shafts by approximately one knife thickness by spacers 36. The diameter and placement of the knives and the shaft spacing are such that the knives on one shaft interleave with the opposing knives on the other shaft.

The cutting action of the knives consists of a tearing action performed by the teeth 34 (see FIG. 6) and a shearing action performed at the sliding juncture between adjacent knives on opposite shafts. Motive force for the shafts is provided by a gearmotor 38 (see FIG. 5) coupled to the shafts via gear spurs 40a, 40b and 40c designed to rotate the shafts in opposite directions. The direction of rotation is such that the cartons are pulled down toward the bottom of the shredding chamber 22, where the shredded carton drops onto the conveyor assembly 10 (see FIG. 1) for transport to the spin drum assembly 12.

Figure 3:
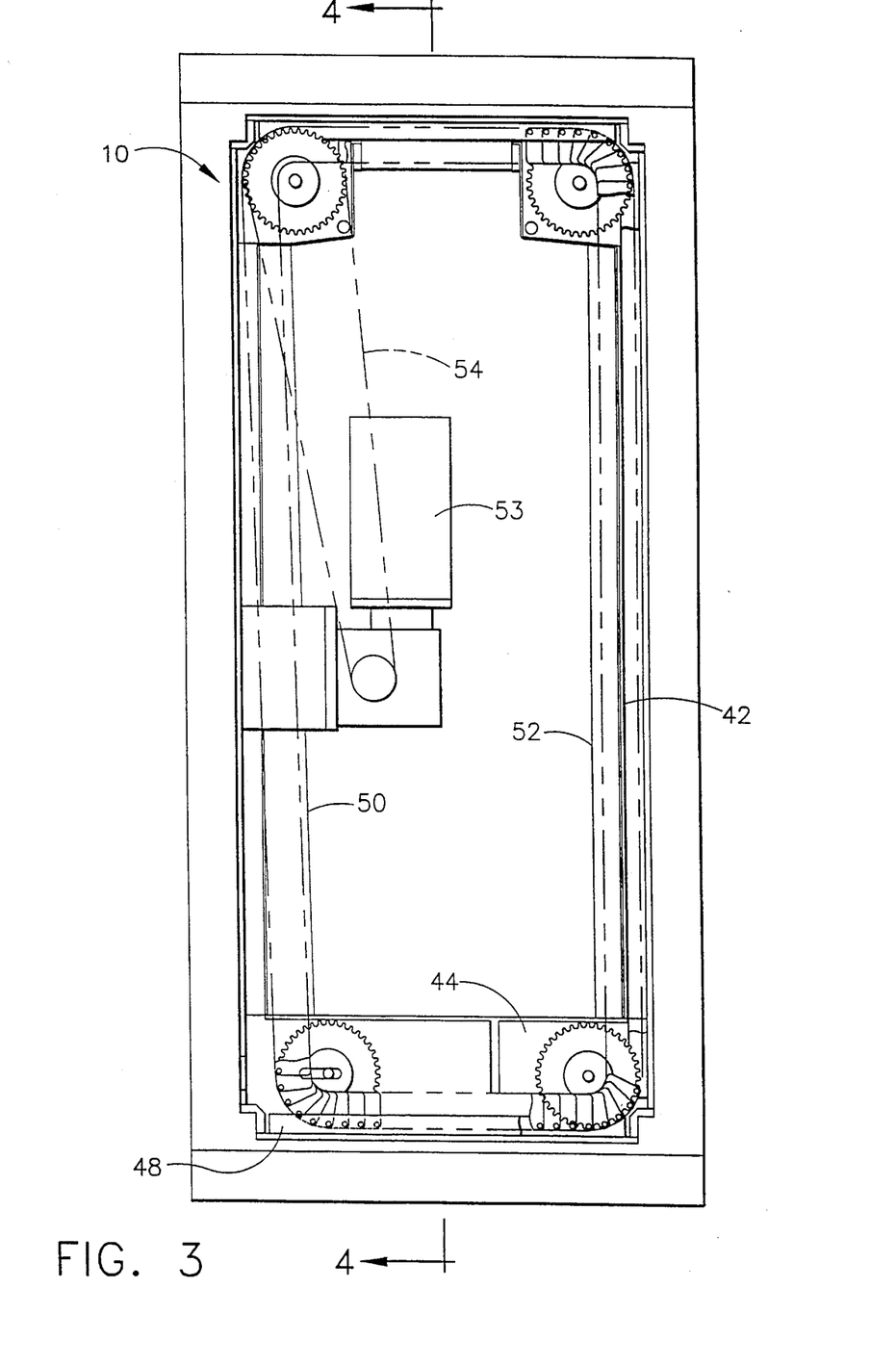
FIGS. 3 and 4 are schematics showing front and side views respectively of the conveyor assembly in accordance with the preferred embodiment of the invention.
Figure 4:
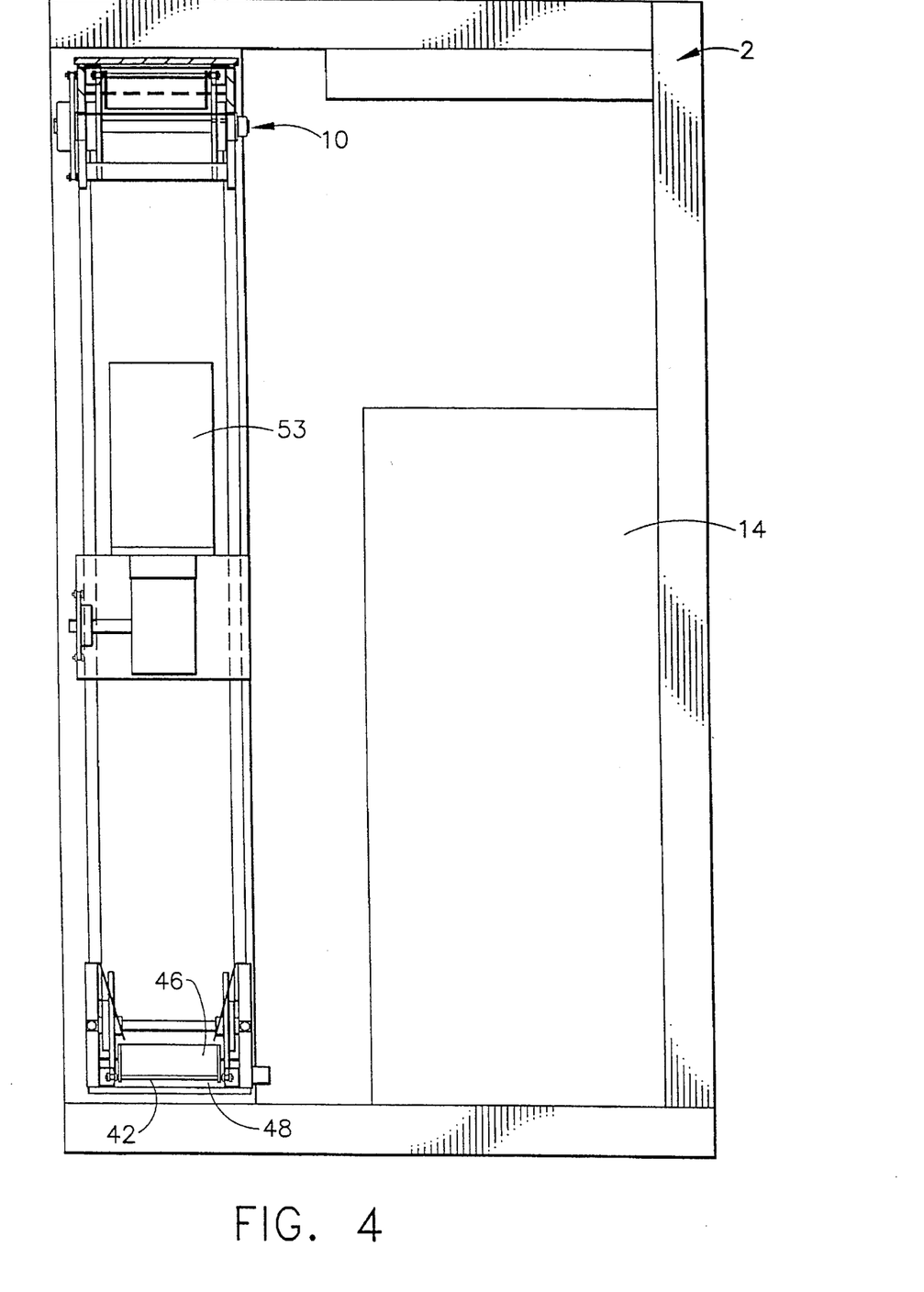

The conveyor assembly 10, shown in FIGS. 3 and 4, consists of a wire mesh conveyor 42 arranged as a closed rectangular loop running parallel to one side of the transportable enclosure 2, with the shredding mechanism 24 located such that the shredded material emerging from the shredding chamber 22 is dropped onto the conveyor 42 at its infeed guide 44.

The conveyor 42 is equipped with paddles 46 at regular intervals on the inside periphery of the loop. The paddles capture shredded material therebetween and carry the shredded material upward on the vertically moving portion of the conveyor. A drain pan 48 lies under the bottom horizontal section of the conveyor 42 to catch excess liquid from the containers and from the spray heads. Ducts 50, 52 surround the conveyor on the vertical portions to prevent the shreds from falling off the conveyor. A motor 53 supplies motive force to the conveyor via a belt 54 (see FIG. 3).

The conveyor 42 transports the shredded material to the upper portion of the machine as it circulates. A chute 55 (see FIGS. 7 and 8) is located below the upper horizontal section of the conveyor 42. This horizontal portion of the conveyor belt has its paddles pointing downward so that the shredded material is dumped into chute 55. Chute 55 catches the shredded material as it falls off the conveyor and guides it into the spinning drum assembly 12.

Figure 7:
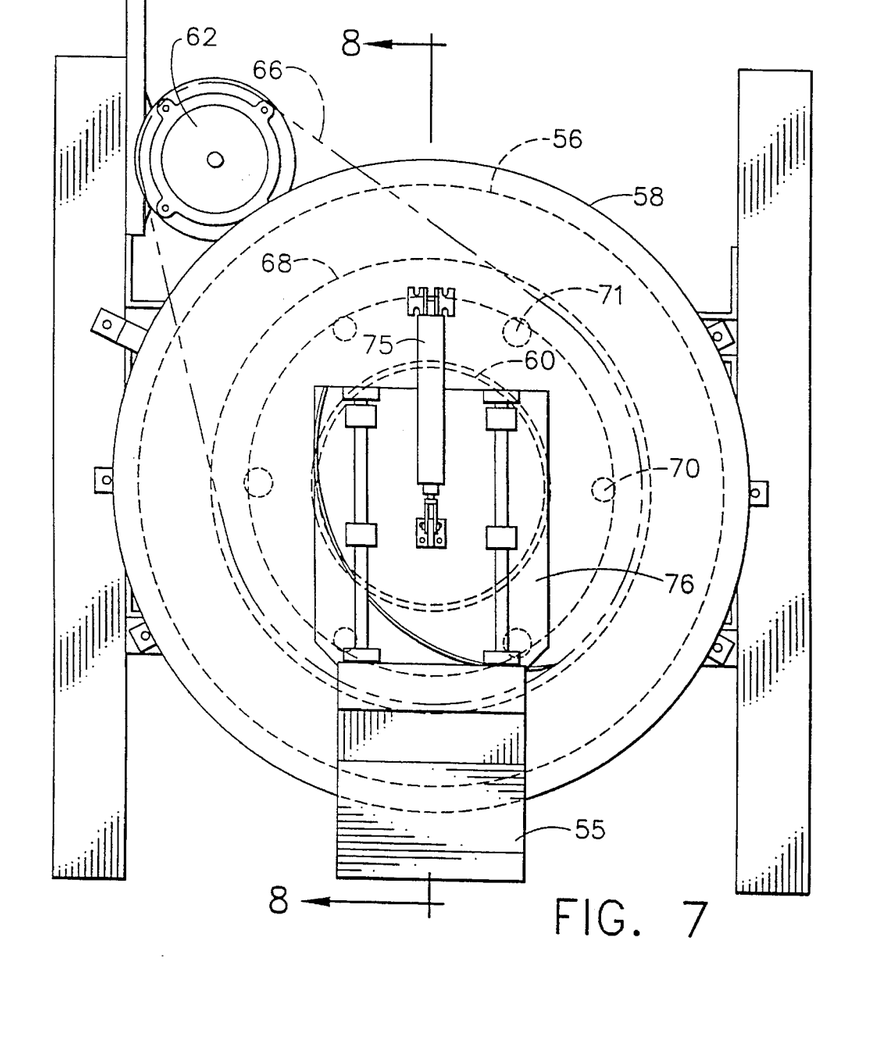
FIG. 7 is a schematic showing a top view of the spin drum assembly in accordance with the preferred embodiment of the invention.

The spinning drum assembly 12 removes the surface liquids from the shredded material by means of a "spin drying" technique. Referring to FIG. 7, the shredded material is deposited in a rotating drum 56 which is perforated on the circumference and mounted such that it rotates in a horizontal plane. A non-perforated stationary drum 58 encloses the spinning drum 56 and catches the water that is thrown off. Both drums are open on the top and equipped with a large central round opening 60 which communicates with a chute 61 (FIG. 8) that empties into the removable storage container 14 (see FIG. 1).

Figure 8:
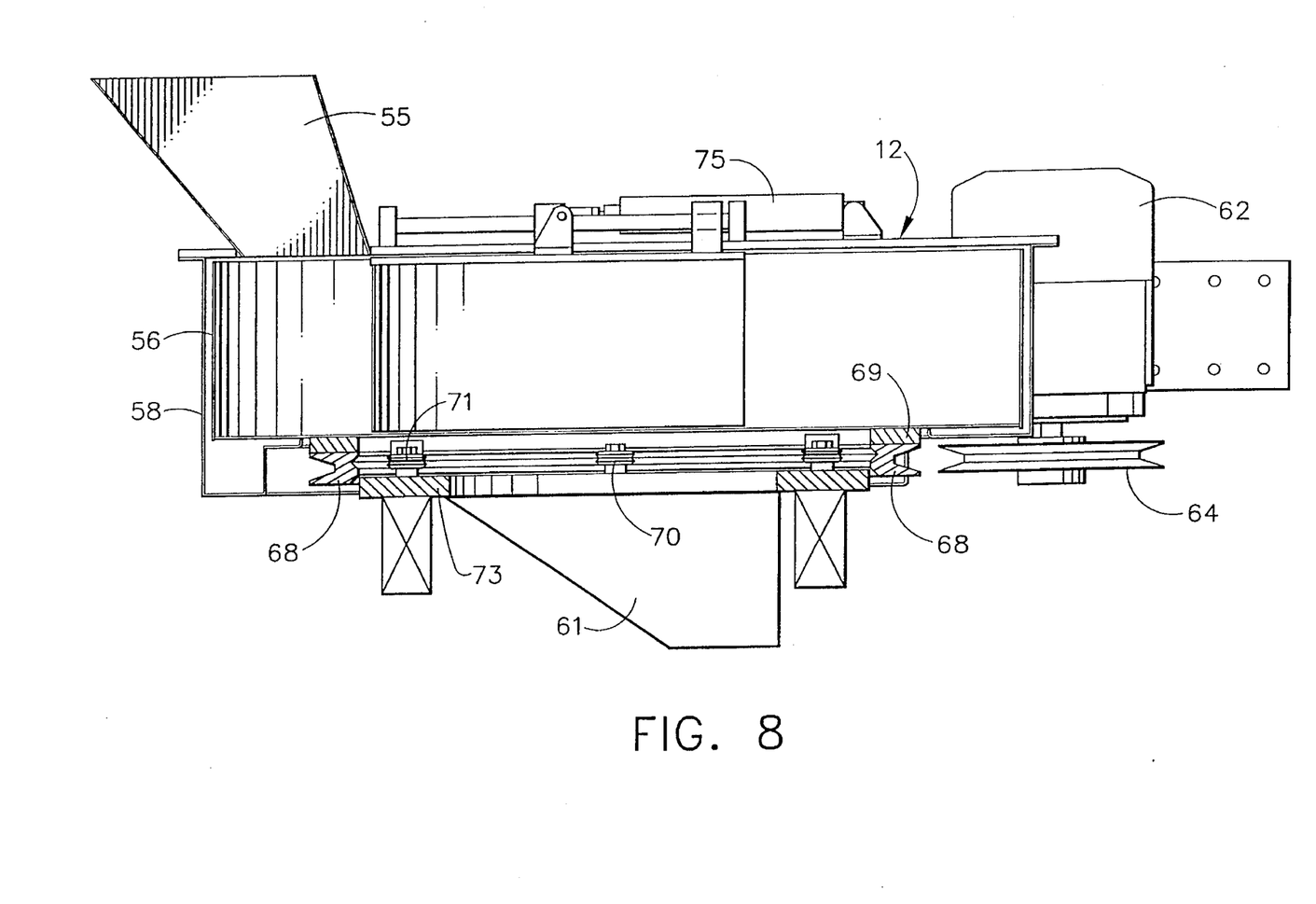
FIG. 8 is a schematic showing a front view of the spin drum assembly in accordance with the preferred embodiment of the invention.

The spinning drum 56 is rotated by a spindle motor 62, which is connected to a V-belt sheave 64. The V-belt sheave 64 transfers rotational force to a spin pulley 68 via a V-belt 66 (see FIG. 7). The spin pulley 68 is connected to the spinning drum 56 by a mounting disk 69 causing the spinning drum 56 to rotate in unison with spin pulley 68. The spin pulley 68 rotates around three dual-V wheels 70 and three camroll followers 71 rotatably mounted on a mounting ring 73 as shown in FIGS. 7 and 8.

Figure 9A:
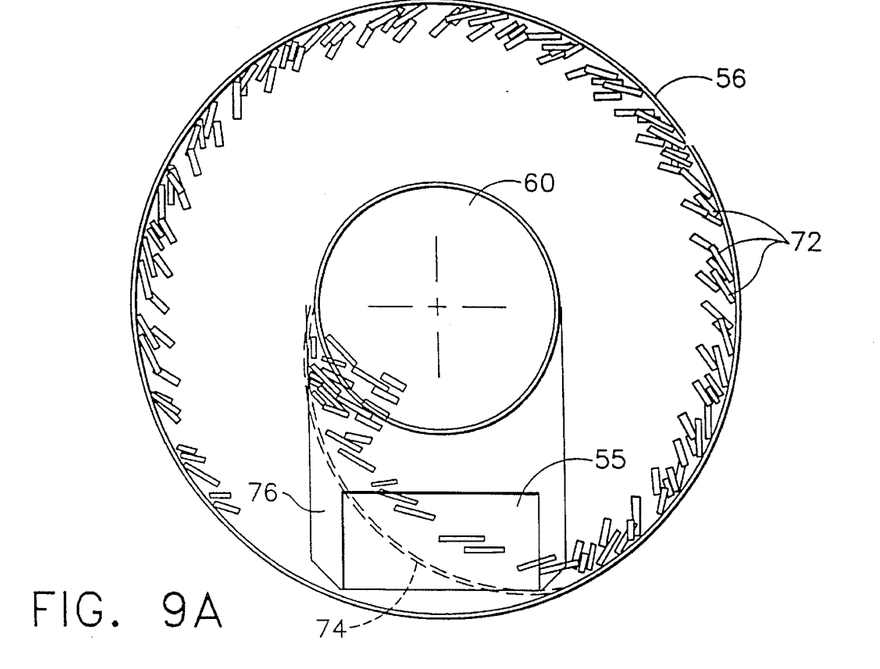
FIGS. 9A and 9B are schematics showing a top view of the spin drum assembly with the plow assembly respectively advanced and retracted in accordance with the preferred embodiment of the invention.
Figure 9B:
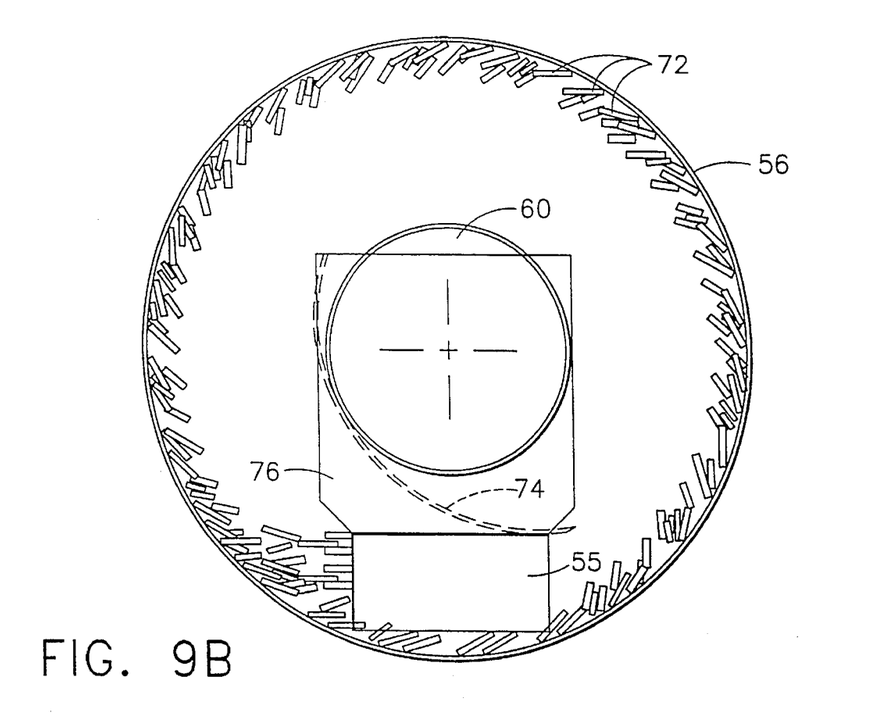

Referring to FIGS. 9A and 9B, emptying of the shredded material 72 from the spinning drum 56 is controlled by a plow assembly 74 consisting of a section of sheet metal curved in a vertical plane and positioned inside the spinning drum 56. The plow assembly 74 is moved horizontally between two positions by an electronically controlled air cylinder 75 (see FIGS. 7 and 8). The piston of cylinder 75 moves a plate 76 attached to the top of the plow assembly 74. When the plow 74 is advanced (FIG. 9A), the leading vertical edge of the plow 74 is adjacent to the circumference of the spinning drum 56, and when the plow is retracted (FIG. 9B), it is spaced away from the circumference of the spinning drum 56.

The plow 74 is retracted during the drying cycle and is advanced during the emptying cycle. In the retracted position, plow 74 does not interfere with the shredded material 72 which congregates at the outer wall of spinning drum 56 under the influence of centrifugal forces. Additional wet shredded material is allowed to enter the spinning drum 56 when the plow 74 is in the retracted position because top plate 76 does not cover chute 55. In the advanced position, the leading edge of plow 74 projects into the path of the spinning shredded material, effectively scooping the shredded material radially inwardly along its arc. At the end of the plow, the shredded material is dumped into receptacle 14 via opening 60 and chute 61 (see FIGS. 2B and 8).

To prevent additional wet shredded material from being deposited into the spinning drum 56 while the plow is in its advanced position for removing dried shredded material, the top plate 76 attached to the top portion of the plow 74 closes off the chute 55. The plate 76 and the plow 74 are moved simultaneously by the air cylinder 75.

The sanitizing system consists of a series of spray nozzles (not shown) strategically located at various places inside the loading chute 20, shredding chamber 22, and optionally in the conveyor 10 and spinning 12 mechanisms. A chemical metering pump (not shown) incorporated into the equipment adds a sanitizer chemical to the water such that the fluid used in the washing consists of an appropriately diluted concentration of sanitizer.

The control system consists of a suitably programmed control unit that sequentially operates the various mechanisms of the machine.

The ventilation system consists of a blower (not shown) and an optional heating element (not shown) that may be used to provide evaporation drying capability. Hot air may be applied to the shredded material at various points following the shredding and washing sections of the apparatus to further reduce the water content of the stored material.

SEQUENCE OF OPERATIONS

The functions of the equipment include three separate timed sequences that may operate independently and simultaneously depending on the rate at which cartons are fed into the machine. The three sequences consist of a loading cycle, a shredding cycle and a drying cycle.

Loading Cycle

The loading cycle (see FIG. 10A) begins with a sensor at the loading door 16 which detects that the door has been opened and subsequently closed again, signaling that a carton has been placed in the loading chamber 4. When closure of the loading door 16 is detected, a solenoid-controlled door locking mechanism is activated and the trapdoor 18 is opened, dropping the carton into the loading chute 20. Simultaneously, an optional water spray may be directed at the interior of the loading chamber while the door is locked to provide a cleaning action. The trapdoor 18 is then closed and the loading door 16 is unlocked, enabling the machine to accept another carton.

Shredder Cycle

Figure 10A:
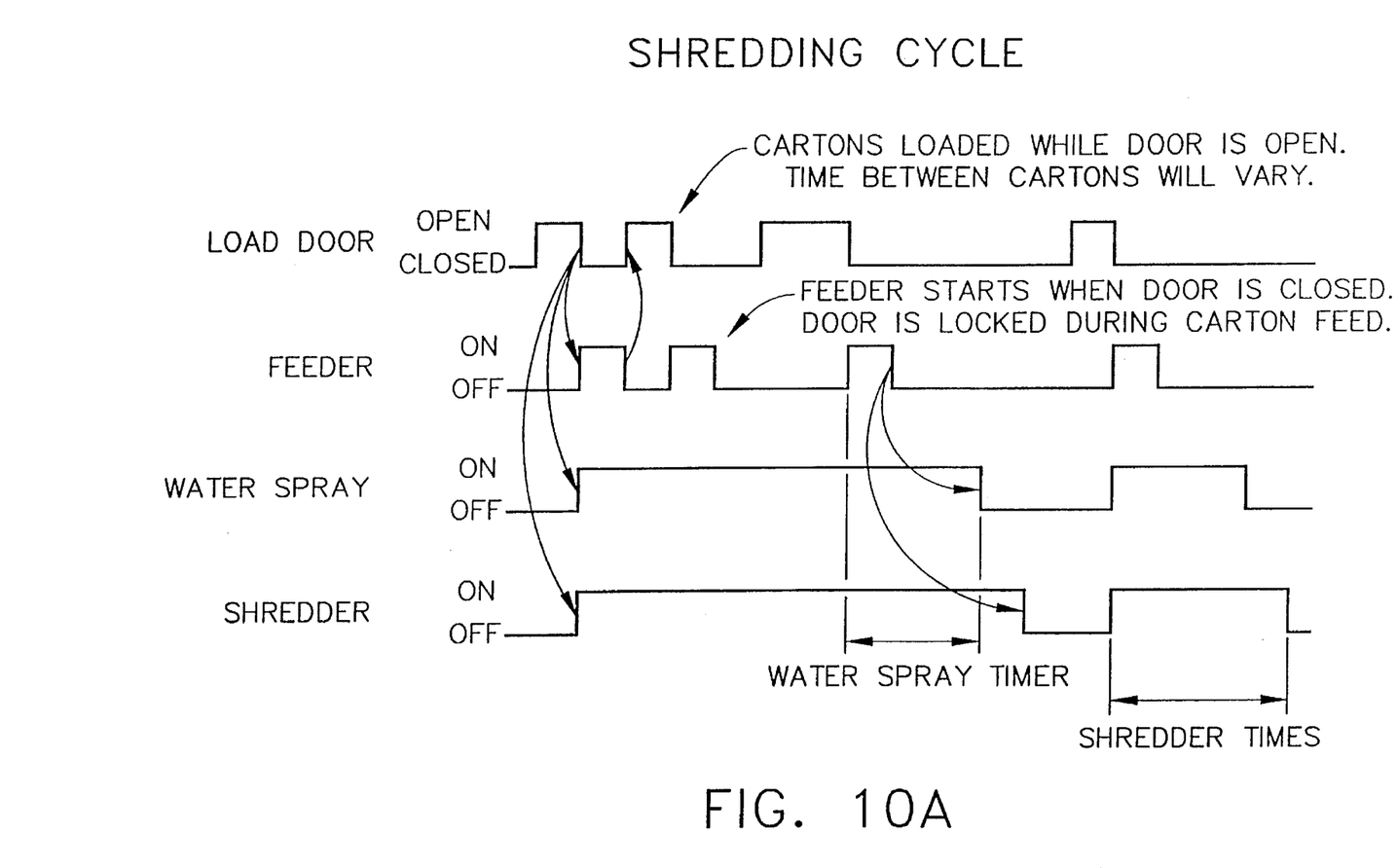
FIGS. 10A and 10B are timing diagrams showing the sequence of operations of the shredding and drying cycles respectively in accordance with the preferred embodiment of the invention.

The series of operations for the shredding cycle are also shown in FIG. 10A. The shredding mechanism 6 is started when the trapdoor 18 is actuated (when the loading door 16 is closed) and runs for a programmed period of time sufficient to pass the cartons through the shredder. The water spray in the shredding chamber 22 is turned on at the same time as the shredder and operates for a programmed period of time.

Drying Cycle

Figure 10B:
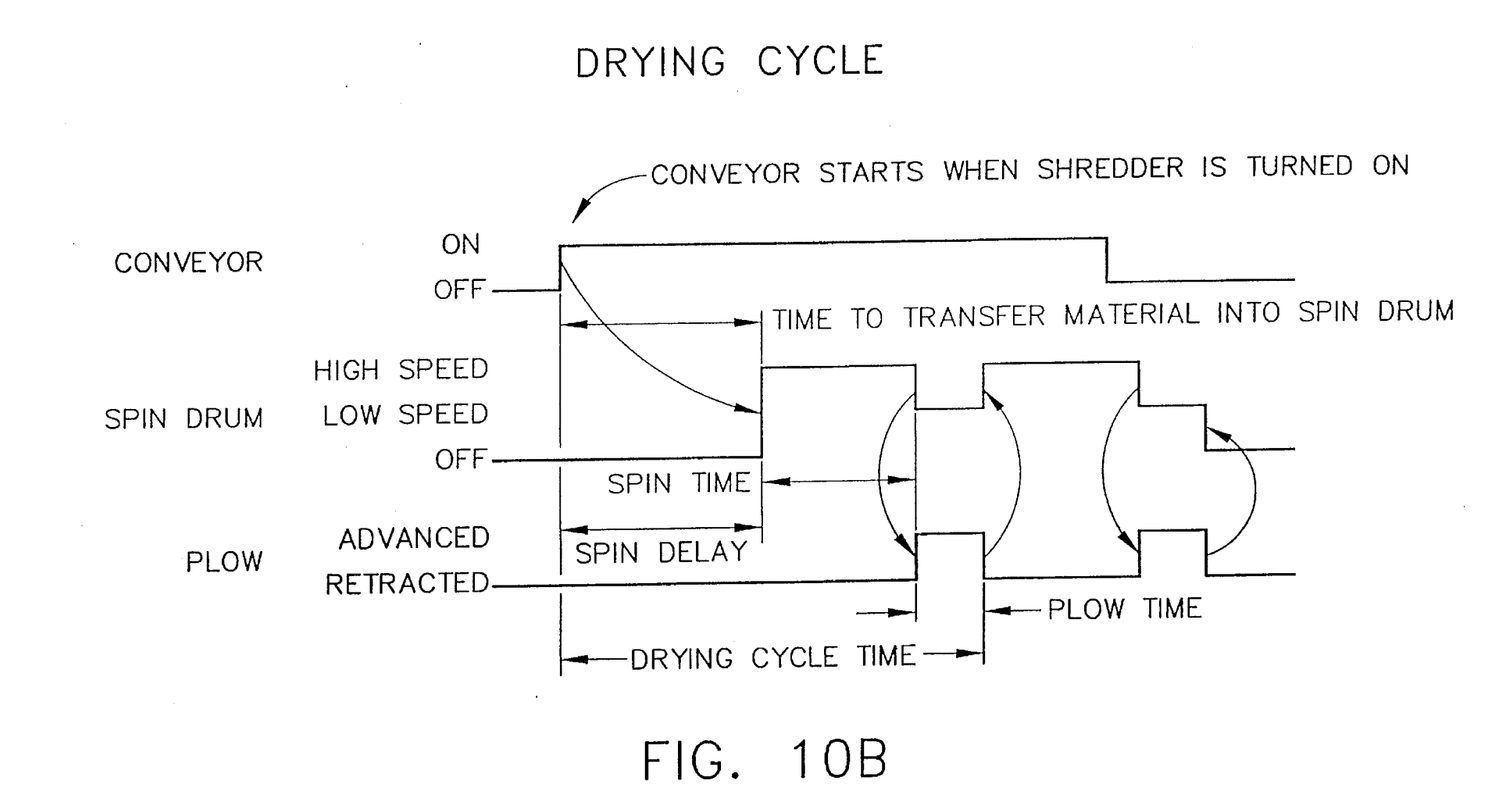

The conveyor mechanism 10 is started at the same time as the shredder and operates for a programmed period of time (see FIG. 10B) sufficient to transport the shredded material to the top of the machine, where it is dropped into the spin drum assembly 12 for drying. The drying cycle, as shown in FIG. 10B, is started when shredded material begins to be deposited into the spin drum 56. The spin drum 56 is started and rotates for a programmed period of time. If material continues to be deposited in the drum during the spinning, the spinning time is prolonged until the drum contains a given quantity of shredded material. An intermittent water spray may optionally be directed at the material in the drum during spinning to assist in the washdown of the material. The water spray is discontinued a programmed period of time before the spinning stops to remove any added water. The plow mechanism 74 is actuated to remove the material from the spinning drum 56 when the spin drum has completed its drying cycle. After a time sufficient to remove the shredded material, the plow is retracted and the spinning is stopped, provided additional material is not still being deposited in the drum. In the latter case, the spin cycle is repeated without interruption. The spinning speed is reduced when the plow is advanced.

Ventilation may be added to the shredded material in the storage bin to assist in drying. Also, an internal wash cycle may be performed to clean the machine during periods in which it is not in use.

In accordance with a second preferred embodiment suitable for use in dairies, a stationary solid waste recycling system will accept liquid containers from half-pints up to half-gallons filled with milk or juice for shredding, sanitizing and storing. The apparatus breaks open the containers during the shredding process and empties the liquid. In this embodiment, a plurality of spray heads washes the containers during shredding. The liquid product is then drained off into the sewer system and the shredded containers are deposited onto a drying conveyor. The drying conveyor passes through gas-fired heaters and air blowers that remove all water residue from the washed shreds and deposits the shreds into the storage receptacle.

Although the invention has been described with reference to certain preferred embodiments, it will be appreciated that it would be obvious to one of ordinary skill in the art of solid waste recycling systems that the preferred embodiments could be readily modified to meet specific conditions not disclosed here. All such variations and modifications are intended to be within the scope and spirit of the invention as defined in the claims appended hereto.

We claim:

1. A method for recycling containers containing residual liquids at a remote location, comprising the following steps:
   depositing the containers through an inlet in a housing;
   shredding the containers into shreds in a shredding zone;
   washing and sanitizing said shreds with a washing liquid to produce washed shreds;
   drying said washed shreds in a drying zone to produce dried shreds; and
   storing said dried shreds in a storage receptacle until shipment to a central recycling facility,
   wherein said shredding, said washing, said drying and said storing steps all take place inside said housing and said inlet prevents access to said shredding zone while the containers are being deposited.

2. The method as recited in claim 1, wherein the containers are deposited into said housing through a front hinged door and dropped to said shredding zone through a bottom hinged door, said bottom hinged door remaining locked in a closed position until said front hinged door has been opened and closed.

3. The method as recited in claim 1, wherein the containers are shredded by passing the containers through two sets of interleaved knives mounted on contra-rotating parallel shafts.

4. The method as recited in claim 1, further comprising dropping said shreds from said shredding zone into a drainage zone inside said housing.

5. The method as recited in claim 4, further comprising draining off said washing liquid and said residual liquids in said drainage zone.

6. The method as recited in claim 1, further comprising elevating said washed shreds from a location below said shredding zone to a location above said drying zone.

7. The method as recited in claim 6, wherein said washed shreds are elevated by a conveying means arranged as a closed loop running parallel to one inner side of said housing.

8. The method as recited in claim 6, wherein said washing liquid is sprayed onto said shreds while said shreds are being shredded or elevated to said drying zone.

9. The method as recited in claim 1, wherein said washed shreds are dried by spinning said shreds inside a rotating drum to produce centrifugal forces which separate moisture from said washed shreds.

10. The method as recited in claim 9, wherein said washed shreds enter said rotating drum through a first opening and are removed from said rotating drum through a second opening.

11. The method as recited in claim 10, wherein said dried shreds are removed from said rotating drum by deflecting said dried shreds from the circumference of said rotating drum toward said second opening.

12. The method as recited in claim 11, wherein said dried shreds are deflected by a plow means movable between first and second positions, said plow means comprising a curved plow disposed in said second position to deflect shreds from the circumference of said rotating drum and a cover which closes said first opening when said plow is in said second position and opens said first opening when said plow means is in said first position.

13. The method as recited in claim 1, wherein said storage receptacle is slidably removable from inside said housing.

14. The method as recited in claim 1, wherein said housing is portable.

15. A method for recycling containers containing residual liquids, comprising the following steps:
    depositing the containers through an inlet in a housing;
    shredding the containers into shreds in a shredding zone;
    washing said shreds with a washing liquid to produce washed shreds;
    drying said washed shreds in a drying zone to produce dried shreds;
    elevating said washed shreds from a location below said shredding zone to a location above said drying zone; and
    storing said dried shreds in a storage receptacle,
    wherein said shredding, said washing, said drying, said elevating and said storing steps all take place inside said housing.

16. The method as recited in claim 15, wherein said washed shreds are elevated by a conveying means arranged as a closed loop running parallel to one inner side of said housing.

17. A method for recycling containers containing residual liquids at a remote location, comprising the following steps:
    depositing the containers through an inlet in a housing;
    shredding the containers into shreds in a shredding zone;
    washing and sanitizing said shreds with a washing liquid to produce washed shreds;
    drying said washed shreds in a drying zone to produce dried shreds; and
    storing said dried shreds in a storage receptacle until shipment to a central recycling facility,
    wherein said shredding, said washing, said drying and said storing steps all take place inside said housing and said washed shreds are dried by spinning said shreds inside a rotating drum to produce centrifugal forces which separate moisture from said washed shreds.

18. The method as recited in claim 17, wherein said washed shreds enter said rotating drum through a first opening and are removed from said rotating drum through a second opening.

19. The method as recited in claim 18, wherein said dried shreds are removed from said rotating drum by deflecting said dried shreds from the circumference of said rotating drum toward said second opening.

20. The method as recited in claim 19, wherein said dried shreds are deflected by a plow means movable between first and second positions, said plow means comprising a curved plow disposed in said second position to deflect shreds from the circumference of said rotating drum and a cover which closes said first opening when said plow is in said second position and opens said first opening when said plow means is in said first position.

* * * * *